(12) United States Patent
Yang et al.

(10) Patent No.: US 8,804,323 B2
(45) Date of Patent: Aug. 12, 2014

(54) ELECTRONIC DEVICE

(75) Inventors: Cho-Chuan Yang, New Taipei (TW);
 Chun-Hsi Lin, New Taipei (TW);
 Zhang-Xiang Hu, Shenzhen (CN);
 Nien-Chang Wang, New Taipei (TW);
 Shu-Hao Lu, New Taipei (TW)

(73) Assignees: Hong Fu Jin Precision Industry (ShenZhen) Co., Ltd., Shenzhen (CN);
 Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/585,424

(22) Filed: Aug. 14, 2012

(65) Prior Publication Data

US 2013/0108256 A1   May 2, 2013

(30) Foreign Application Priority Data

Oct. 31, 2011  (CN) .......................... 2011 2 0422944

(51) Int. Cl.
 *H05K 5/00* (2006.01)
 *H05K 7/00* (2006.01)
 *G06F 1/16* (2006.01)
 *H01Q 1/24* (2006.01)
(52) U.S. Cl.
 USPC ............ 361/679.23; 361/679.21; 361/679.22; 361/679.24; 343/702

(58) Field of Classification Search
 USPC ............ 361/679.21, 679.22, 679.23, 679.24; 343/702
 See application file for complete search history.

(56) References Cited

U.S. PATENT DOCUMENTS

| | | | |
|---|---|---|---|
| 8,094,443 B2* | 1/2012 | Yamaguchi | 361/679.26 |
| 8,456,818 B2* | 6/2013 | Tracy et al. | 361/679.02 |
| 8,526,170 B2* | 9/2013 | Nishikawa et al. | 361/679.01 |
| 2008/0266774 A1* | 10/2008 | Tracy et al. | 361/683 |
| 2009/0058739 A1 | 3/2009 | Konishi | |
| 2010/0090910 A1* | 4/2010 | Iizuka | 343/702 |
| 2011/0080696 A1* | 4/2011 | Nishikawa et al. | 361/679.01 |
| 2011/0216492 A1* | 9/2011 | Murakata | 361/679.08 |

* cited by examiner

*Primary Examiner* — Anthony Haughton
(74) *Attorney, Agent, or Firm* — Novak Druce Connolly Bove + Quigg LLP

(57) ABSTRACT

An electronic device includes a casing defining a first opening and a through hole, a first antenna, a first cover, and a camera module. The first antenna is mounted in the casing and whose position corresponds to the position of the first opening. The first cover is detachably fixed in the first opening and covering the first antenna. The camera module is mounted in the casing and includes a lens module received in the through hole for converging light incident thereon. The first antenna and the camera module are arranged in a first line, the first cover being fixed in the first opening is separated from the camera module by a first predetermined distance in a first direction parallel with the first line.

18 Claims, 4 Drawing Sheets

ELECTRONIC DEVICE

BACKGROUND

1. Technical Field

The disclosed embodiments relate to an electronic device.

2. Description of Related Art

Electronic devices, such as notebook computers, include a casing, an antenna, a camera module, and a protection cover. The casing defines an opening, the antenna and the camera module are mounted in the casing, the position of the antenna corresponds to the position of the opening, the position of the camera module also corresponds to the position of the opening. The protection cover covers the antenna and the camera module and is detachably fixed in the opening.

However, the thickness of the camera module is larger than the thickness of the antenna, and the protection cover being fixed in the opening contacts with the camera module. Therefore the thickness of the casing may be large, which does not fulfill the requirement of the thin design of the electronic device.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout four views.

DETAILED DESCRIPTION

Figure 1:
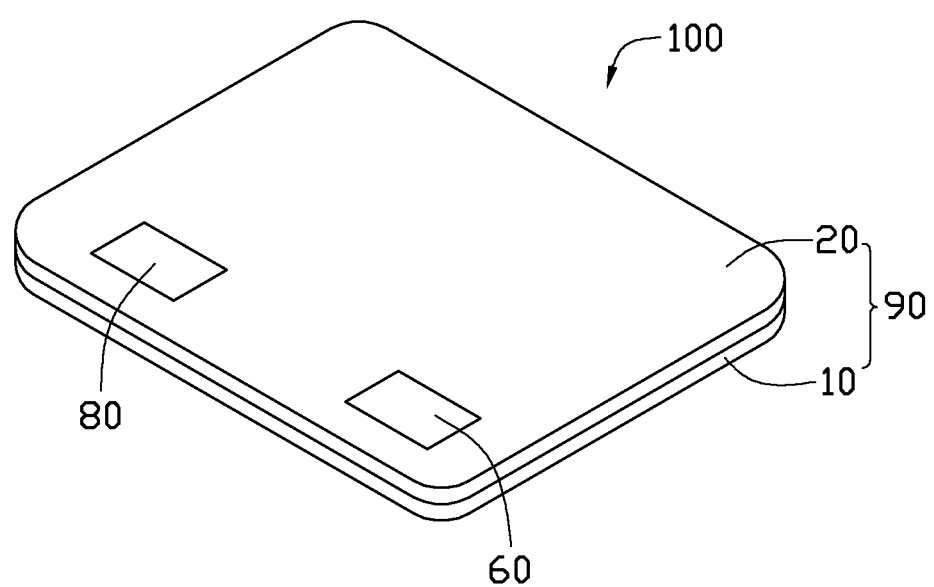
FIG. 1 is a perspective view showing an electronic device in accordance with an embodiment, the electronic device is viewed from one direction.
Figure 2:
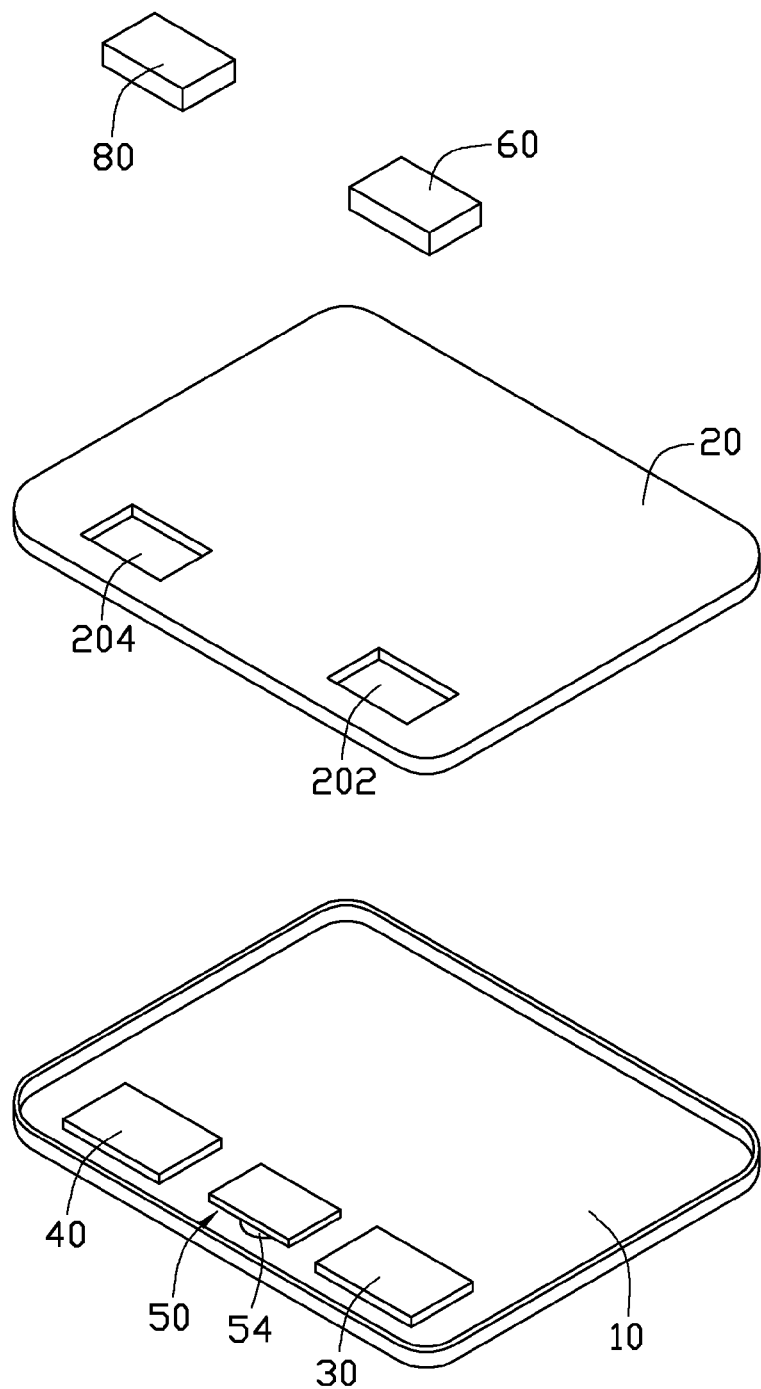
FIG. 2 is an exploded view showing the electronic device of FIG. 1.

Referring to FIGS. 1 and 2, an electronic device 100 includes a casing 90, a first antenna 30, a second antenna 40, a camera module 50, a first cover 60, and a second cover 80. The casing 90 includes a base portion 10 and a cover portion 20. The cover portion 20 is configured to mate with the base portion 10 to form a receiving space for receiving the first antenna 30, the second antenna 40, and the camera module 50 therein. The first antenna 30, the second antenna 40, and the camera module 50 are mounted to the base portion 10 and are arranged in a same first line. The camera module 50 is located between the first antenna 30 and the second antenna 40. In the embodiment, the casing 90 is made of a metallic material.

The cover portion 20 defines a first opening 202 and a second opening 204. The position of the first opening 202 corresponds to the position of the first antenna 30, and the position of the second opening 204 corresponds to the position of the second antenna 40.

Figure 3:
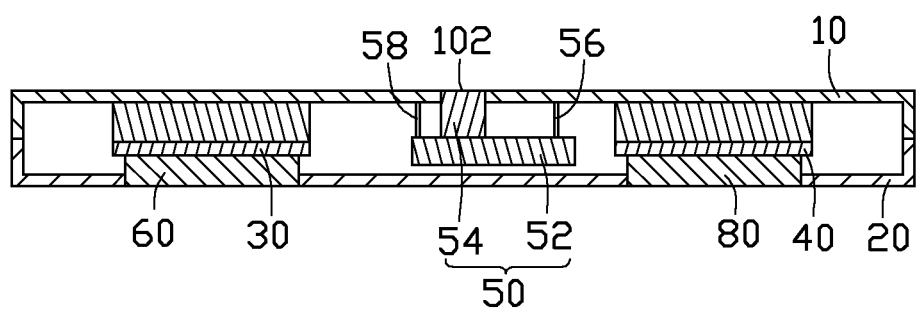
FIG. 3 is a cross-sectional view showing the electronic device of FIG. 1.

Referring to FIG. 3, the first cover 60 is detachably fixed in the first opening 202 and covers the first antenna 30, the second cover 80 is detachably fixed in the second opening 204 and covers the second antenna 40. The first cover 60 being fixed in the first opening 202 contacts with the first antenna 30, and the second cover 80 being fixed in the second opening 204 contacts with the second antenna 40. The first cover 60 being fixed in the first opening 202 is substantially flush with an external surface of the casing 90, and the second cover 80 being fixed in the second opening 204 is substantially flush with the external surface of the casing 90. In the embodiment, the first cover 60 and the second cover 80 are made of a plastic material.

The thickness of the camera module 50 is larger than the thickness of the first antenna 30, and the thickness of the camera module 50 is larger than the thickness of the second antenna 40. The first cover 60 being fixed in the first opening 202 is separated from the camera module 50 by a first predetermined distance in a first direction parallel with the first line; the second cover 80 being fixed in the second opening 204 is separated from the camera module 50 by a second predetermined distance in the first direction parallel with the first line. In one embodiment, the first predetermined distance is equivalent to the second predetermined distance. Because the thickness of the camera module 50 is larger than the thickness of the first antenna 30 or the second antenna 40, and the first cover 60 being fixed in the first opening 202 does not contact with the camera module 50, the second cover 80 being fixed in the second opening 204 does not contact with the camera module 50, the thickness of the casing 90 can be small, which can fulfill the requirement of the thin design of the electronic device 100.

Figure 4:
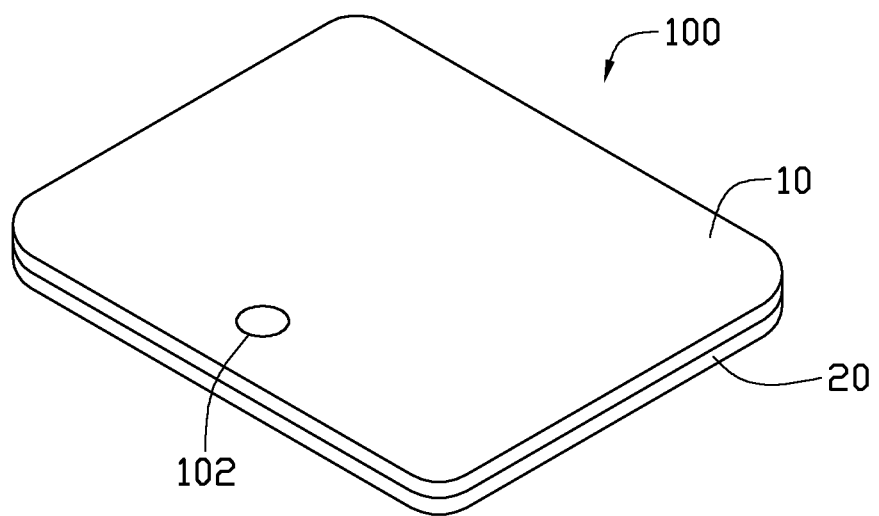
FIG. 4 is a perspective view showing the electronic device of FIG. 1, the electronic device is viewed from the other direction.

The camera module 50 includes a circuit board 52, a lens module 54, and a image sensor (not shown). The circuit board 52 is mounted to the base portion 10 via two locating pins 56, 58. The lens module 54 is mounted to the circuit board 52, the lens module 54 is located between the circuit board 52 and the base portion 10. Referring to FIG. 4, the base portion 10 defines a through hole 102, the lens module 54 is received in the through hole 102 for converging light incident thereon to form converged light. The image sensor converts the converged light into electrical signals and transmits the electrical signal to the circuit board 52 for further processing. In the embodiment, the lens module 54 being received in the through hole 102 is substantially flush with the external surface of the casing 90.

Alternative embodiments will become apparent to those skilled in the art without departing from the spirit and scope of what is claimed. Accordingly, the present disclosure should not be deemed to be limited to the above detailed description, but rather only by the claims that follow and the equivalents thereof.

What is claimed is:

1. An electronic device, comprising:
    a casing defining a first opening, a second opening, and a through hole;
    a first antenna mounted in the casing and whose position corresponds to the position of the first opening;
    a second antenna mounted in the casing and whose position corresponds to the position of the second opening;
    a first cover for being detachably fixed in the first opening and covering the first antenna;
    a second cover for being detachably fixed in the second opening and covering the second antenna; and
    a camera module mounted in the casing and comprising a lens module received in the through hole for converging light incident thereon; wherein the first antenna, the camera module, and the second antenna are arranged in a same first line, and the camera module is located between the first antenna and the second antenna; the first cover being fixed in the first opening is separated from the camera module by a first predetermined distance in a first direction parallel with the first line; the second cover being fixed in the second opening is separated from the camera module by a second predetermined distance in the first direction parallel with the first line.

2. The electronic device of claim 1, wherein the casing is made of a metallic material, and the first cover and the second cover are made of a plastic material.

3. The electronic device of claim 1, wherein the thickness of the camera module is larger than the thickness of the first antenna, and the thickness of the camera module is larger than the thickness of the second antenna.

4. The electronic device of claim 1, wherein the casing comprises a base portion and a cover portion configured to mate with the base portion to form a receiving space for receiving the first antenna, the second antenna, and the camera module; the first opening and the second opening are defined in the cover portion, the through hole is defined in the base portion; the first antenna, the second antenna, and the camera module are mounted to the base portion.

5. The electronic device of claim 4, wherein the camera module further comprises a circuit board mounted to the base portion, the lens module is mounted to the circuit board, the lens module is located between the circuit board and the base portion.

6. The electronic device of claim 5, wherein the circuit board is mounted to the base portion via two locating pins.

7. The electronic device of claim 1, wherein the lens module being received in the through hole is substantially flush with the external surface of the casing.

8. The electronic device of claim 1, wherein the first cover being fixed in the first opening is substantially flush with an external surface of the casing, and the second cover being fixed in the second opening is substantially flush with the external surface of the casing.

9. The electronic device of claim 1, wherein the first cover being fixed in the first opening contacts with the first antenna, and the second cover being fixed in the second opening contacts with the second antenna.

10. The electronic device of claim 1, wherein the first predetermined distance is equivalent to the second predetermined distance.

11. An electronic device, comprising:
a casing defining a first opening and a through hole;
a first antenna mounted in the casing and whose position corresponds to the position of the first opening;
a first cover for being detachably fixed in the first opening and covering the first antenna; and
a camera module mounted in the casing and comprising a lens module received in the through hole for converging light incident thereon; wherein the first antenna and the camera module are arranged in a first line, the first cover being fixed in the first opening is separated from the camera module by a first predetermined distance in a first direction parallel with the first line.

12. The electronic device of claim 11, wherein the casing is made of a metallic material, and the first cover is made of a plastic material.

13. The electronic device of claim 11, further comprising
a base portion defining the through hole; and
a cover portion defining the first opening; the cover portion configured to mate with the base portion to form a receiving space for receiving the first antenna and the camera module therein;
wherein the first antenna and the camera module are mounted to the base portion.

14. The electronic device of claim 11, wherein a casing further defines a second opening, the electronic device further comprises a second antenna mounted in the casing and whose position corresponds to the position of the second opening and a second cover configured for being detachably fixed in the second opening and covering the second antenna; the first antenna, the camera module, and the second antenna are arranged in a same first line, and the camera module is located between the first antenna and the second antenna; the second cover being fixed in the second opening is separated from the camera module by a second predetermined distance in the first direction parallel with the first line.

15. The electronic device of claim 14, wherein the casing comprises a base portion and a cover portion configured to mate with the base portion to form a receiving space for receiving the first antenna, the second antenna, and the camera module therein; the first opening and the second opening are defined in the cover portion, the through hole is defined in the base portion; the first antenna, the second antenna, and the camera module are mounted to the base portion.

16. The electronic device of claim 11, wherein the lens module being received in the through hole is substantially flush with the external surface of the casing.

17. The electronic device of claim 14, wherein the first cover being fixed in the first opening is substantially flush with an external surface of the casing, and the second cover being fixed in the second opening is substantially flush with the external surface of the casing.

18. The electronic device of claim 14, wherein the first cover being fixed in the first opening contacts with the first antenna, and the second cover being fixed in the second opening contacts with the second antenna.

* * * * *